(No Model.)
G. LAUBE.
STEAM COFFEE OR TEA POT.
No. 524,281. Patented Aug. 7, 1894.
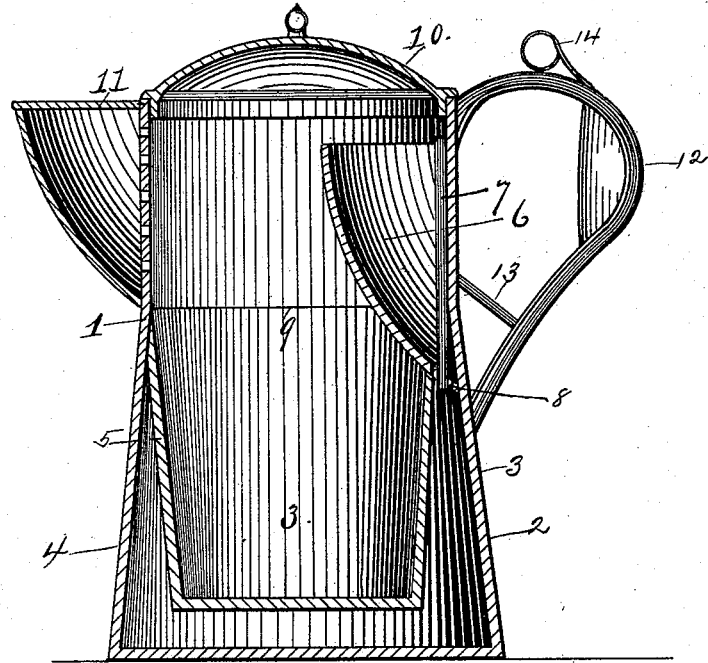
WITNESSES:
INVENTOR
Godfried Laube
BY
Evert Appleman
ATTORNEYS.

United States Patent Office.

GODFRIED LAUBE, OF HURON, SOUTH DAKOTA, ASSIGNOR OF ONE-HALF TO JOSEPH HYMANN, OF DEL RIO, TEXAS.

STEAM COFFEE OR TEA POT.

SPECIFICATION forming part of Letters Patent No. 524,281, dated August 7, 1894.

Application filed September 23, 1893. Serial No. 486,276. (No model.)

*To all whom it may concern:*

Be it known that I, GODFRIED LAUBE, a citizen of the United States of America, residing at Huron, in the county of Beadle and State of South Dakota, have invented certain new and useful Improvements in Steam Coffee or Tea Pots, of which the following is a specification, reference being had to the accompanying drawing.

This invention relates to certain new and useful improvements in "steam coffee and tea pots" and consists in the novel construction, combination and arrangement of parts to be hereinafter more particularly described and specifically pointed out in the claim.

The object of this invention is to provide a pot for making coffee or tea by steam heat, which will prevent the loss of the aroma during the operation; furthermore to provide a coffee or tea pot having two compartments, one within the other, and means for supplying the outer chamber with water and further means for allowing the escapement of air when the water is entering through the inlet; furthermore to so arrange the parts that the steam generated in both the inner and outer compartments may be collected and retained in the inner compartment, where the coffee or tea is placed for steeping.

A still further object of my invention is to construct a coffee pot that will be extremely simple, durable and inexpensive to manufacture.

Referring to the accompanying drawing forming a part of this specification and wherein like numerals of reference indicate similar parts throughout the view, the figure is a vertical sectional view through the center of my improved coffee pot.

In the drawing: 1, represents the coffee pot proper.

2, designates the outer or water vessel, 3, the inner vessel.

4, is the outer wall of the water vessel, 5, the inner wall, 6, the water inlet spout, 7, the air escape tube, 8, 8, the apertures arranged in the inner wall 5 to allow the water passage through the spout to the outer vessel.

9, represents the flange on the body portion, where the walls of the outer and inner portions are joined.

10, represents a lid of the ordinary construction, 11, the spout, 12, the handle having a support, 13, and a thumb rest 14.

The coffee and water for the decoction are placed in the inner vessel and the water for steaming in the outer receptacle, being usually poured in through its spout and apertures, the vent pipe allowing the air to escape; this vessel is almost filled and then the pot is ready for operation. Heat being applied, the steam passes all around and over the inner vessel through the spout and is retained in the spout by means of the practically air tight lid. When the coffee is made in this way, it may be easily poured out through the spout without interfering with the water in the outer vessel and after the coffee has been drained, the water in the outer vessel may be then poured out through the spout or inlet.

I am fully aware that coffee and tea have been steamed in this manner before, and I therefore do not claim this principle broadly.

Having fully described my invention, what I claim as new, and desire to obtain by Letters Patent, is—

In a coffee pot the double walls forming an inner and outer chamber, an interiorly arranged spout connecting said chambers and a vent tube arranged in the spout communicating with the inner chamber, substantially as described.

In testimony whereof I affix my signature in presence of two witnesses.

GODFRIED LAUBE.

Witnesses:
 HATTIE R. LAUBE,
 ANNIE T. LAUBE.